United States Patent [19]

Bernert et al.

[11] 4,042,570

[45] Aug. 16, 1977

[54] TEREPHTHALIC ACID COPOLYESTERS WHICH CAN BE DYED IN THE ABSENCE OF CARRIERS

[75] Inventors: Claus-Rüdiger Bernert, Bomlitz, Cordingen; Eduard Radlmann; Günther Nischk, both of Dormagen, all of Germany

[73] Assignee: Bayer Aktiengesellschaft, Leverkusen, Germany

[21] Appl. No.: 607,945

[22] Filed: Aug. 26, 1975

[30] Foreign Application Priority Data

Aug. 30, 1974 Germany .............................. 2441537

[51] Int. Cl.² .............................................. C08G 63/18

[52] U.S. Cl. .................................................. 260/75 M
[58] Field of Search ..................................... 260/75 M

[56] References Cited

U.S. PATENT DOCUMENTS 3,261,812  7/1966  Bell et al. .......................... 260/75 M

*Primary Examiner*—Sandra M. Person
*Attorney, Agent, or Firm*—Plumley and Tyner

[57] ABSTRACT

High molecular weight polyesters from terephthalic acid and 1,4 cyclohexane dimethanol, containing in polycondensed form a polytetrahydrofurane diol Fibers and filaments produced from these polyesters can be dyed carrier-free.

7 Claims, No Drawings

TEREPHTHALIC ACID COPOLYESTERS WHICH CAN BE DYED IN THE ABSENCE OF CARRIERS

This invention relates to terephthalic acid copolyesters modified with polytetrahydrofuran diols which can be dyed with dispersion dyes in the absence of carriers and which are obtained by the melt condensation of terephthalic acid, or its derivatives, with 1,4-bis-(hydroxy methyl)-cyclohexane and a polytetrahydrofuran diol.

Dispersion dyes are virtually the only dyes which can be used for dyeing polyester fibres of polyethylene terephthalate or poly(1,4-cyclohexylene-dimethylene terephthalate) with a non-disturbed molecular structure. During dyeing, the dispersion dyes diffuse very slowly into the non-crystalline zones of the fibres. In order to increase the receptivity of the polyester fibres for dispersion dyes, dyeing may be carried out at temperatures of up to 130° C in order to increase the rate at which the dyes diffuse into the fibres. One disadvantage of this process is that dyeing has to be carried out in expensive high-pressure installations, and in addition to this disadvantage mixtures with wool cannot be dyed on account of the danger of felting at elevated temperatures.

The carrier process enables dyeing to be carried out at boiling temperatures in existing installations. The carrier temporarily loosens up the molecular structure so that the dispersion dye is more readily able to diffuse into the non-crystalline zone. Since inter alia compounds such as aromatic hydrocarbons, aromatic chlorinated hydrocarbons, phenols, salicyclic acid esters or cresotinic acid esters are used as carriers, the effort involved in avoiding atmospheric pollution, low biodegradability in the effluent and high toxicity of the carriers, is very considerable. In addition, condensation on machine components may occur as a result of the generally high volatility of the carriers. The material being dyed is in danger of being marked as a result of subsequent dripping.

There have been many attempts to enable polyester fibres to be dyed with ionic dyes by producing copolyesters with comonomers containing sulphonate groups. One disadvantage of this approach is the presence of the built-in salt structure which frequently results in incompatibility and inferior mechanical properties of the fibres.

Accordingly, it would be advantageous to be able to produce a fibre-forming polyester by co-condensing a component which loosens up the molecular structure and whose properties, for example melting point or textile data, differ only negligibly from those of the homopolyester. However, it has been found that low molecular weight components, for example diols such as 1,2-propylene glycol, 1,4-butane diol, 1,6-hexane diol, or dicarboxylic acids such as adipic acid, although loosening up the molecular latice, simultaneously reduce the properties of the fibres to a no longer acceptable level.

Accordingly, it was surprising to find that copolyester fibres of terephthalic acid or its derivatives, 1,4-bis-(hydroxy methyl)-cyclohexane and small quantities of polytetrahydrofuran diols can be excellently dyed with dispersion dyes at 98° C without any need to use carriers and without any adverse effects upon the valuable textile-technological properties of the fibres compared with fibres produced from the corresponding homopolyester.

It is an object of this invention to provide polyesters that are readily dyeable without carriers and without applying high temperatures. Other objects will be evident from the description and the examples.

These objects are accomplished by high molecular weight linear terephthalic acid copolyesters and consisting of recurring structural elements corresponding to the general formula:

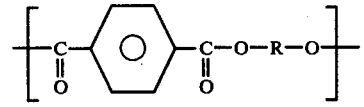

in which
R, in a proportion of from 95 to 99.99 mol %, represents a radical corresponding to the formula:

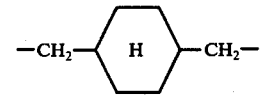

and R, in a proportion of from 0.01 to 5 mol %, represents a radical corresponding to the formula:

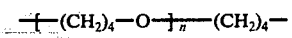

in which n is an integer from 5 to 70, the terephthalic acid copolyesters having relative solution viscosities $\eta_{rel}$ of from 1.1 to 4.0 (as measured on a solution of 1.0 g of copolyester in 100 ml of o-chlorophenol at 25° C).

The terephthalic acid copolyesters preferably contain from 5 to 10% by weight of co-condensed polyether diols.

To produce the polyether diol-modified terephthalic acid copolyesters which can be dyed in the absence of carriers, terephthalic acid derivatives corresponding to the general formula:

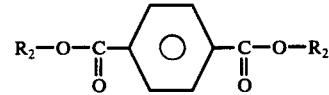

in which R₂ represents hydrogen or a linear or branched alkyl radical with from 1 to 10 carbon atoms, are polycondensed in admixture with 1,4-bis-(hydroxy methyl)-cyclohexane and a suitable polytetrahydrofuran diol in the melt, at temperatures in the range of from 200° to 320° C, in an inert gas atmosphere, at pressures between normal pressure and 0.001 Torr and in the presence of catalysts known per se, in such quantitative ratios that the co-condensed polyether diol content amounts to between 0.01 to 5 mol % based on the total amount of diols co-condensed in the copolyesters.

The modified terephthalic acid copolyesters obtained in this way can be readily processed from the melt to form shaped articles, especially filaments and films.

Suitable polyether diols are polytetrahydrofurans with molecular weights of preferably from 400 to 5000. If the molecular weight is too low, the resulting polyesters show inferior mechanical properties, in addition to which the melting point of the polymer is drastically lowered. If the molecular weight is too high, the polyether diol may only be co-condensed at one end, if at all, on account of its considerable chain length.

Polytetrahydrofurans are particularly suitable for use in the process according to the invention because, when they are present in the copolyester, light stability and, above all, hydrolysis stability are much more favourable than in cases where polyethylene glycols are used.

In addition to free terephthalic acid, it is also possible to use esters of terephthalic acid, for example terephthalic acid dimethyl ester or terephthalic acid-bis-β-hydroxy ethyl ester, as dicarboxylic acid components.

The 1,4-bis-(hydroxy methyl)-cyclohexane used for condensation normally consists of a mixture of approximately 73% of the trans-isomer and 27% of the cis-isomer which is formed during hydrogenation of the intermediate product. To obtain special properties, however, it is also possible to use an isomer mixture of different composition or the pure components.

The terephthalic acid copolyesters according to the invention are produced with the usual transesterification and condensation catalysts. However, it is particularly preferred to use esters of titanic acid, for example tetraisopropyl titanate or tetrabutyl titanate.

In one preferred embodiment of the process according to the invention, polycondensation is carried out by gradually heating the reaction mixture, consisting of terephthalic acid dimethyl ester, 1,4-bis-(hydroxy methyl)-cyclohexane, polyether diol and a catalyst or catalyst mixture, the 1,4-bis-(hydroxy methyl)-cyclohexane being used in excess for transesterification, with stirring for a period of from 1 to 5 hours in the presence of an inert gas, for example nitrogen or helium. Transesterification is complete after a temperature of around 290° C has been reached, followed by stirring for approximately 1 hour. The reaction mixture is then heated to 290°–320° C and the pressure is reduced, generally to below 15 Torr and preferably to below 1 Torr, the temperature being kept in the range of from 290° to 320° C. Condensation is carried out under these conditions for 1 to 5 hours until the required melt viscosity is obtained. On completion of the reaction, the polyester formed may be processed from the melt to form filaments.

Additives such as pigments, delustrants, discolouration stabilisers, optical lighteners, etc., may be added to the polyester melts without adversely affecting their processing properties.

The new products are distinguished by an excellent natural colour, a high affinity for dispersion dyes, favourable mechanical and thermal properties and good processing properties.

The relative solution viscosities $\eta_{rel.}$ quoted in the following Examples, which are further illustrate the invention without limiting it, were measured at 25° C on solution of 1.0 g of polyester in 100 ml of o-chlorophenol.

EXAMPLE 1

158 parts by weight of 1,4-bis-(hydroxy methyl)-cyclohexane, 194 parts by weight of terephthalic acid dimethyl ester, 30.4 parts by weight of a polytetrahydrofuran diol with a molecular weight of 1000 and 1.0 parts by weight of tetraisopropyl titanate, accommodated in a reaction vessel equipped with a flat-blade anchor stirrer, a gas inlet pipe, a dephlegator, condenser, vacuum adapter and receiver, are heated under nitrogen as quickly as possible by means of an oil bath or metal bath preheated to 300°–315° C, and transesterified for about 1 hour. The introduction of nitrogen is then interrupted and the pressure slowly reduced over a period of 1 hour to 0.1 Torr. On account of the increase in the viscosity of the melt, the speed of the stirrer, approximately 150 rpm, is reduced shortly after melting to approximately 20 rpm. The colourless, homogeneous melt may be processed into shaped articles such as, for example, filaments. The polyester contains 10% by weight of polytetrahydrofuran diol units, based on the polyester (= 3 mol %, based on total diol units). The filaments, which have a softening range of 290°–295° C and a relative solution viscosity of 1.72, are stretched in a ratio of 1:2.7 by drawing over a plate heated to 130° C, and are then dyed by the open method on a water bath.

Dyeing is carried out with a dispersion, acidified with acetic acid to pH 4.5, of 1.1% by weight of a dye corresponding to the formula:

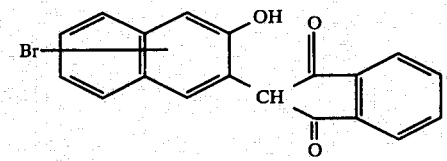

0.76% by weight of a dye corresponding to the formula:

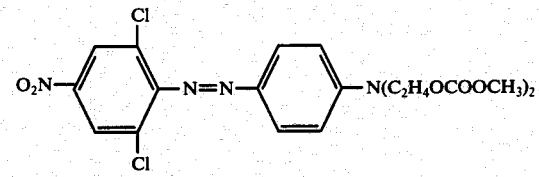

0.15% by weight of a dye corresponding to the formula:

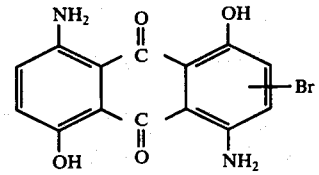

and 2% by weight of an anionic dispersant in water, in which the fibres are held for 1.5 hours at boiling temperature. The filaments take on a very good, uniform and deep dye finish which is highly washproof.

When a comparison polyester sample, to which no polytetrahydrofuran diol was added during condensation, is treated in a dye bath of the same composition, all that is obtained after 1.5 hours at 98° C is a superficial dye effect. Although this sample can also be effectively dyed by the addition of 2% of a carrier, for example o-cresotinic acid methyl ester, to the dye bath, it surprisingly does not have the depth of colour obtained with the filaments modified with polytetrahydrofuran diol.

EXAMPLE 2

194 parts by weight of terephthalic acid dimethyl ester, 158 parts by weight of 1,4-bis-(hydroxy methyl)-cyclohexane, 13.9 parts by weight of a polytetrahydrofuran diol with a molecular weight of 3000 and 0.1 part by weight of tetraisopropyl titanate, are condensed in the apparatus and under the conditions described in Example 1. The polyester obtained in this way contains 5% by weight of polytetrahydrofuran diol units based on the polyester (= 0.46 mol % based on total diol units). Filaments spun from the melt are stretched in a ratio of 1:2.7 and dyed deeply without a carrier in the same way as described in Example 1. The copolyester has a softening range of 292° to 295° C and a relative solution viscosity of 1.75.

EXAMPLE 3

194 parts by weight of terephthalic acid dimethyl ester, 158 parts by weight of 1,4-bis-(hydroxy methyl)-cyclohexane, 13.9 parts by weight of a polytetrahydrofuran diol with a molecular weight of 1200 and 0.1 parts by weight of tetrabutyl titanate, are condensed in the same way as described in Example 1. The polyester obtained in this way contains 5% by weight of polytetrahydrofuran diol units, based on the polyester (= 1.2 mol %, based on total diol units). Filaments spun from the melt are stretched in a ratio of 1:2.7 at a temperature of 130° C and dyed deeply without a carrier in the same way as described in Example 1. The copolyester has a softening range of 295° to 297° C and a relative solution viscosity of 1.88.

EXAMPLE 4

158 parts by weight of 1,4-bis-(hydroxy methyl)-cyclohexane, 194 parts by weight of terephthalic acid dimethyl ester, 20.6 parts by weight of a polytetrahydrofuran diol with a molecular weight of 1000 and 0.1 parts by weight of tetraisopropyl titanate, are condensed in the same way as described in Example 1. The polyester obtained in this way contains 7% by weight of polytetrahydrofuran diol units, based on the polyester (= 2 mol %, based on total diol units). The polyester is spun into filaments. The filaments are stretched in a ratio of 1:2.7 at a temperature of 130° C and dyed for 1.5 hours at 98° C in an aqueous dispersion of 0.3% by weight of a dye corresponding to the formula:

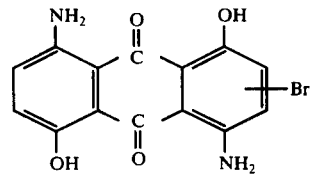

and 2% by weight of an anionic dispersant adjusted with acetic acid to pH 4.5. A deep, washproof blue dye finish is obtained its depth of colour exceeding that of an unmodified comparison sample which had been dyed in the presence of a carrier. The copolyester has a softening range of 194° to 197° C and a relative solution viscosity of 1.78.

What we claim is:

1. A high molecular weight linear terephthalic acid copolyester, which comprises recurring structural elements corresponding to the general formula (I):

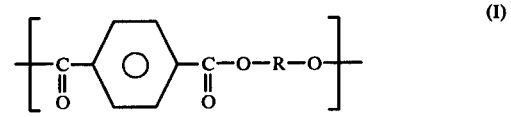

in which
R, in a proportion of from 95 to 99.99 mol %, represents a radical corresponding to the formula:

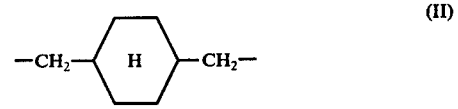

and R, in a proportion of from 0.01 to 5 mol %, represents a radical corresponding to the formula:

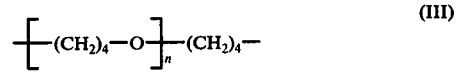

in which $n$ is an integer from 5 to 70, the terephthalic acid copolyester having a relative solution viscosity $\eta_{rel.}$ of from 1.1 to 4.0 (as measured on a solution of 1.0 g of copolyester in 100 ml of o-chlorophenol at 25° C).

2. A copolyester as claimed in claim 1, which contains from 5 to 10% by weight of the polyether diol in co-condensed form, based on the total quantity of polyester.

3. A copolyester as claimed in claim 1 or 2, wherein the co-condensed polyether diol has a molecular weight in the range of from 400 to 5000.

4. A process for the production of a high molecular weight linear terephthalic acid copolyester, which comprises polycondensing a terephthalic acid derivative corresponding to the general formula (IV):

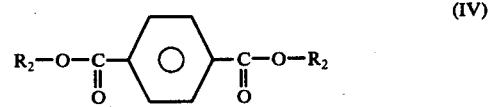

in which $R_2$ represents hydrogen or a linear or branched alkyl radical with from 1 to 10 carbon atoms,
with 1,4-bis-(hydroxy methyl)-cyclohexane and with a polyether diol corresponding to the general formula (V):

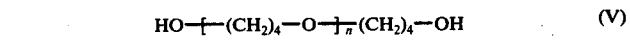

in which $n$ is an integer from 5 to 70, said polycondensing being effected at a temperature of from 200° to 320° C in an inert gas atmosphere, at a pressure between normal pressure and 0.001 Torr and in the presence of a catalyst and in such quantitative ratios that the resulting polyester contains from 0.01 to 5 mol % of co-condensed polyether diol, based on the total of diols co-condensed in the copolyester.

5. A process as claimed in claim 4, wherein said polycondensing takes place in the melt.

6. A process as claimed in claim 4, wherein said catalyst is an ester of titanic acid.

7. Filaments and fibres comprising a polyester as claimed in claim 1.

* * * * *